(12) United States Patent
Niu et al.

(10) Patent No.: US 6,473,818 B1
(45) Date of Patent: *Oct. 29, 2002

(54) APPARATUS AND METHOD IN A NETWORK INTERFACE DEVICE FOR ASYNCHRONOUSLY GENERATING SRAM FULL AND EMPTY FLAGS USING CODED READ AND WRITE POINTER VALUES

(75) Inventors: Autumn J. Niu, Sunnyvale; Po-shen Lai, San Jose; Jerry Chun-Jen Kuo, San Jose; John Chiang, San Jose, all of CA (US)

(73) Assignee: Advanced Micro Devices, Inc., Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/150,038

(22) Filed: Sep. 9, 1998

(51) Int. Cl.[7] .......................... G06F 13/30; G06F 13/38
(52) U.S. Cl. ................... 710/129; 710/128; 710/131; 711/168; 711/61; 711/150
(58) Field of Search ................. 710/129, 128, 710/131, 61; 711/156, 149, 150, 168; 395/856, 858, 859; 365/230.05

(56) References Cited

U.S. PATENT DOCUMENTS

| 5,426,756 A | * | 6/1995 | Shyi et al. | |
| 5,471,487 A | * | 11/1995 | Andrighetti | 714/811 |
| 5,555,524 A | * | 9/1996 | Castellano | 365/221 |
| 5,857,087 A | * | 1/1999 | Bemanian et al. | 395/309 |
| 5,867,731 A | * | 2/1999 | Williams et al. | 395/849 |
| 5,898,893 A | * | 4/1999 | Alfke | 710/57 |
| 5,909,563 A | * | 6/1999 | Jacobs | 710/129 |
| 5,918,073 A | * | 6/1999 | Hewitt | 377/47 |
| 5,938,758 A | * | 8/1999 | Katayama et al. | 712/207 |
| 5,974,501 A | * | 10/1999 | Shaver et al. | 711/105 |
| 6,047,001 A | * | 4/2000 | Kuo et al. | 370/428 |
| 6,061,767 A | * | 5/2000 | Kuo et al. | 711/156 |
| 6,067,595 A | * | 5/2000 | Lindenstruth | 710/129 |
| 6,078,623 A | * | 6/2000 | Isobe et al. | 375/259 |
| 6,092,141 A | * | 7/2000 | Lange | 710/129 |
| 6,128,715 A | * | 10/2000 | Wang et al. | 711/168 |
| 6,161,160 A | * | 12/2000 | Niu et al. | 710/129 |
| 6,202,164 B1 | * | 3/2001 | Gulick | 713/400 |

* cited by examiner

Primary Examiner—James P. Trammell
Assistant Examiner—Firmin Backer

(57) ABSTRACT

A network interface device includes a random access memory used as a transmit and receive buffer for transmission and reception of data frames between a host computer bus and a packet switched network. The network interface device includes read and write controllers for each of the transmit and receive buffers, where each write controller operates in a clock domain separate from the corresponding read controller. Read and write counters are each implemented as gray code counters that increment a corresponding pointer value by changing a single bit. A synchronization circuit selectively sets a full or empty flag based on an asynchronous comparison of the read and write pointer values. Use of gray code counters for the read pointer value and write pointer value ensures accurate comparisons in a multi-clock environment.

20 Claims, 6 Drawing Sheets

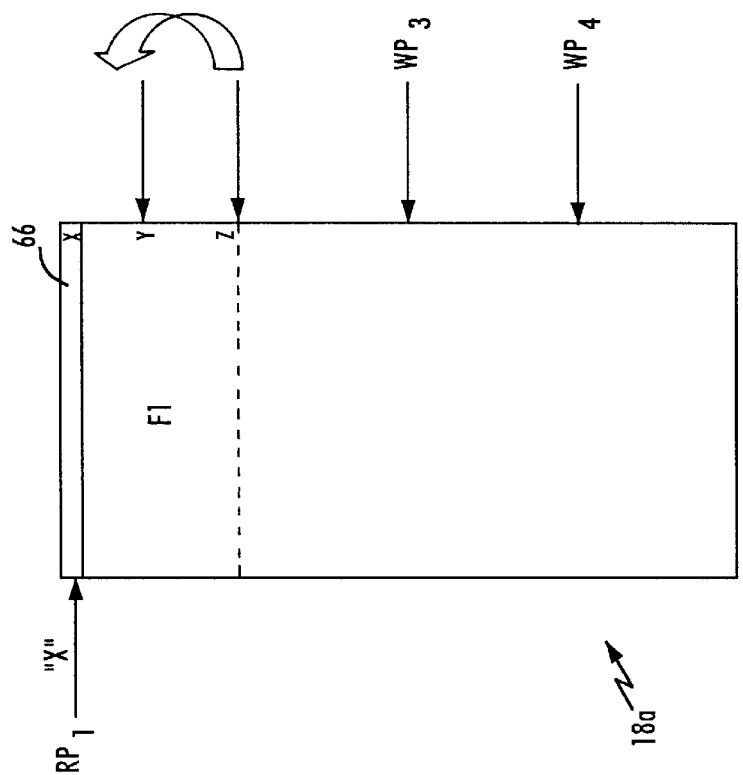
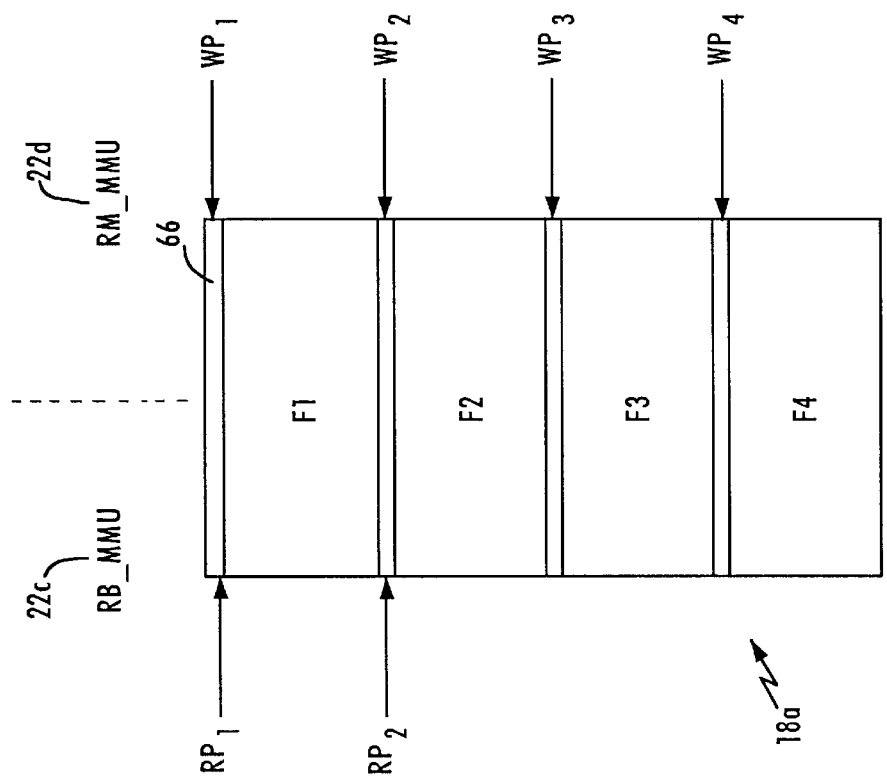
Figure 4B
Figure 4A

APPARATUS AND METHOD IN A NETWORK INTERFACE DEVICE FOR ASYNCHRONOUSLY GENERATING SRAM FULL AND EMPTY FLAGS USING CODED READ AND WRITE POINTER VALUES

BACKGROUND OF THE INVENTION

1. Technical Field

The present invention relates to network interfacing and more particularly, to methods and systems for buffering data between a host bus interface and a media access controller accessing Ethernet media.

2. Background Art

Network interface devices handle packets of data for transmission between a host computer and a network communications system, such as a local area network. The host computer may be implemented as a client station, a server, or a switched hub. One primary function of the network interface device is to buffer data to compensate for timing discrepancies between the clock domain of the host computer and the clock domain of the network.

Network interface devices typically include a first in, first out (FIFO) buffer memory for storing transmit and receive data, where the transmit data is stored in a transmit FIFO buffer prior to transmission on the network media by a media access controller (MAC), and receive data is stored in a receive FIFO by the MAC prior to transfer to the host computer via the host computer bus interface.

One disadvantage with the use of a FIFO queue for a transmit buffer or a receive buffer is the increased latency encountered during the buffering process. The latency of the network interface device is the time delay between the time that a data frame is supplied to the network interface device and the time the data is transmitted on the network media, or vice versa.

An additional problem concerns flow control of the buffer; i.e., controlling the flow of data into and out of the buffer. This problem is complicated by the use of different clock domains by the host computer and the network interface device. For example, buffer overflow or underflow can occur when the time domains between the host bus and the network media are unsynchronized. Overflow occurs when the rate of data stored into the buffer is faster than the data can be removed. An overflow condition may result in lost data and/or wasteful retransmissions. Conversely, underflow occurs if data is removed from the FIFO buffer faster than the data can be supplied, which may result in the incomplete transmission of a transmit packet by the MAC.

Hence, the non-synchronous relationship between the host bus clock domain and the network clock domain have required the use of FIFO buffers to compensate for timing discrepancies between the host computer and the network.

DISCLOSURE OF THE INVENTION

There is a need for an arrangement that enables use of a random access memory in a network controller, as opposed to a FIFO buffer, to compensate for timing discrepancies between the host computer and the network.

There is also a need for an arrangement enabling the use of a random access memory as a buffer in a network interface device, where potential synchronization problems between the clock domain of the host computer and the clock domain of the network are resolved to enable efficient control of the random access memory during the writing and reading of transmit or receive data.

There is also a need for an arrangement in a network interface device that enables a read controller to read data from a buffer memory onto a host bus with minimal latency and minimal complexity in the network interface device design.

These and other needs are attained by the present invention, where read and write counters having read and write pointer values and are each configured to change a single bit each time the corresponding pointer value is incremented, and a synchronization circuit selectively sets a full or empty flag based on a comparison of the read and write pointer values.

According to one aspect of the present invention, a method in a network interface device comprises writing data into a random access memory in the network interface device based on a first clock, changing a single bit of a write pointer value in response to each occurrence of the writing step, reading stored data from the random access memory based on a second clock independent from the first clock, changing a single bit of a read pointer value in response to each occurrence of the reading step, comparing the read pointer value and the write pointer value, and selectively setting one of a full and empty flag based on the comparing step. The changing of a single bit in the read and write pointer values ensures that no errors occur due to transitional states during changing of values. Hence, accuracy of full and empty flag values is ensured by eliminating the synchronization problems that normally occur in a multi-clock environment.

Another aspect of the present invention provides a network interface device for storing a data frame, comprising a random access memory, a write controller configured for writing data to the random access memory according to a first clock, the write controller including a write counter configured for changing a single bit of a write pointer value in response to writing the data into a corresponding memory location in the random access memory, a read controller configured for reading stored data from the random access memory according to a second clock independent from the first clock, the read controller including a read counter configured for changing a single bit of a read pointer value in response to reading the stored data from a corresponding memory location in the random access memory, and a comparison circuit for selectively determining one of a full condition and an empty condition in the random access memory based on the write pointer value and the read pointer value, independent of the first and second clocks. The changing of a single bit by the counters enables the comparison circuit to accurately determine of the full or empty state of the random access memory independent of the different clocks used in the system.

Still another aspect of the present invention provides a network interface device for storing a data frame, comprising a random access memory, a write controller configured for writing the frame into the random access memory according to a first clock, a read controller configured for reading the frame from the random access memory according to a second clock independent from the first clock, a write counter configured for changing a single bit of a write pointer value in response to a received write signal from the write controller, a read counter configured for changing a single bit of a read pointer value in response to a received read signal from the read controller, and a synchronization circuit configured for selectively generating a signal indicating one of a full or empty condition of the random access memory based on the write pointer value and the read pointer value.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein:

FIGS. 4A and 4B are diagrams illustrating storage conditions when the receive memory of FIG. 2 stores at least one full frame of data and less than one full frame of data, respectively.

BEST MODE FOR CARRYING OUT THE INVENTION

The present invention will be described with the example of a network interface device in a packet switched network, such as an Ethernet (IEEE 802.3) network. The description will first be given of the network interface device architecture, followed by the arrangement for selectively setting a full or empty flag based on a comparison of the write and read pointer values. It will become apparent, however, that the present invention is also applicable to other network interface device systems, especially frame based data communication systems (e.g., token ring (IEEE 802.5), fiber distributed data interface (FDDI), etc.).

NETWORK INTERFACE DEVICE ARCHITECTURE

Figure 1A:
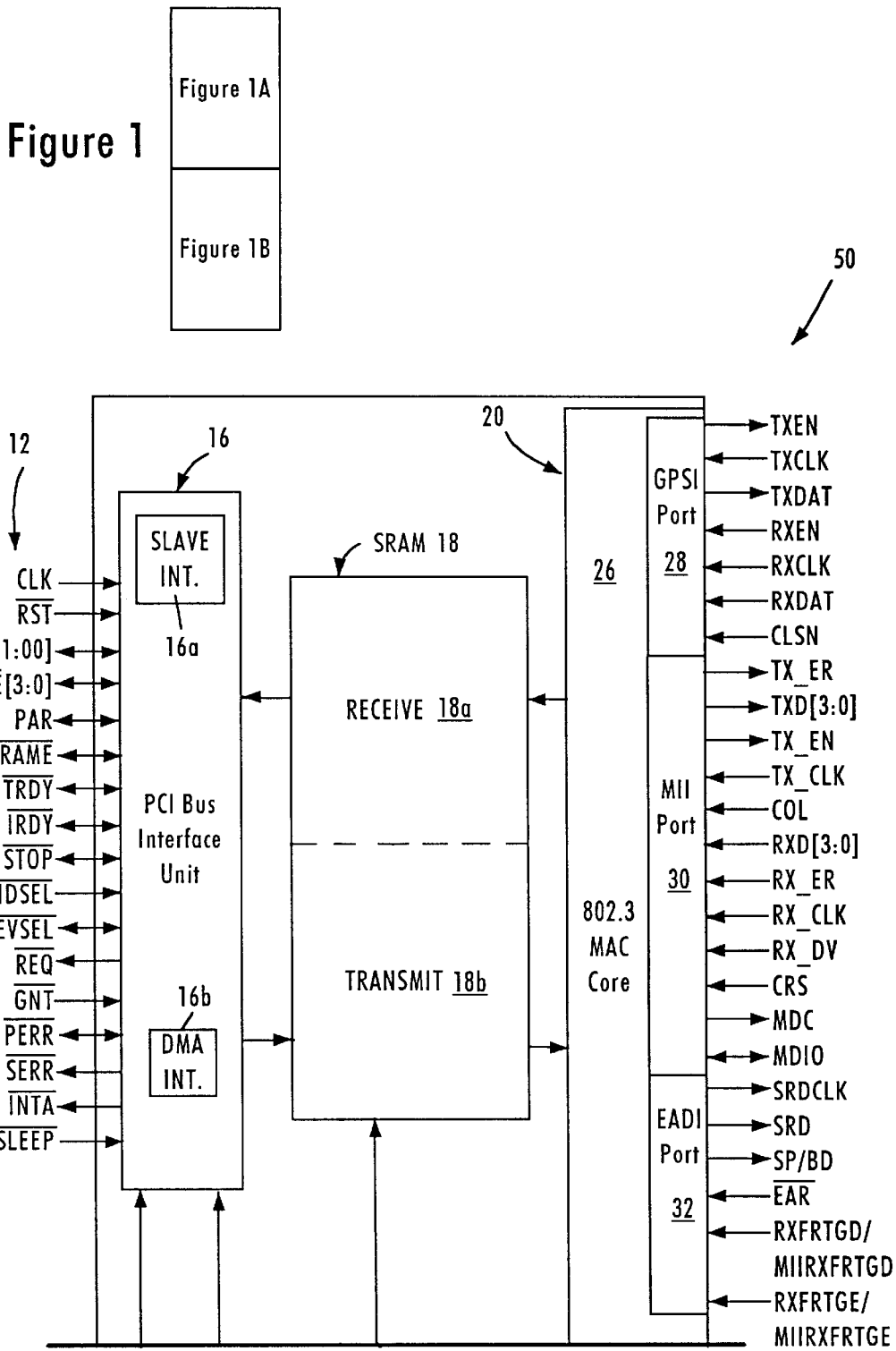
FIG. 1 is a block diagram illustrating an exemplary network interface device having a memory controller for writing data frames to and reading data frames from a random access memory according to an embodiment of the present invention.
Figure 1B:
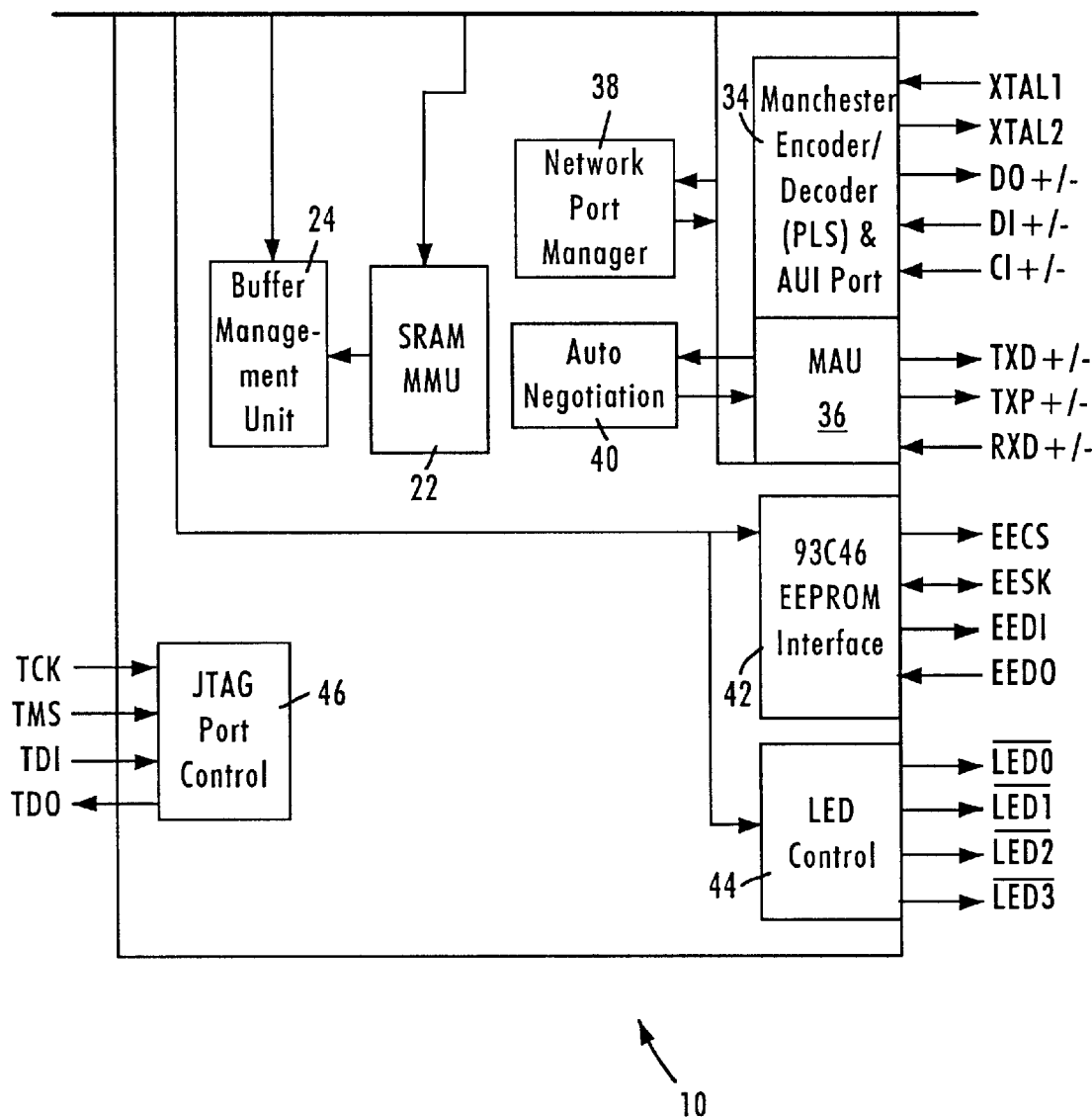

FIG. 1 is a block diagram of an exemplary network interface device 10 that accesses the media of an Ethernet (ANSI/IEEE 802.3) network according to an embodiment of the present invention.

The network interface device 10, preferably a single-chip, 32-bit Ethernet controller, provides an interface between a local bus 12 of a computer, for example a peripheral component interconnect (PCI) local bus, and an Ethernet-based media 50.

The interface 10 includes a PCI bus interface unit 16, a buffer memory portion 18, and a network interface device portion 20. The PCI bus interface unit 16 includes a PCI slave interface 16a and a DMA interface 16b. The slave interface 16a manages PCI control and status information including reading and programming of the PCI status registers, but may also be configured for managing slave transfers via the PCI bus with a host CPU. The DMA interface 16b manages DMA transfers by the network interface device 10 to and from system memory. Hence, the PCI bus interface unit 16 can be selectively configured for PCI transfers in slave and/or master (e.g., DMA) mode.

The memory portion 18 includes a 32-bit SRAM implemented directly on the network interface device chip 10. According to the disclosed embodiment, the SRAM 18 may be accessed in a random access manner under the control of a memory management unit 22, or may be segmented into a receive portion 18a and a transmit portion 18b for receive and transmit paths, respectively.

The network interface device 10 also includes a buffer management unit 24 configured for managing DMA transfers via the DMA interface 16b. The buffer management unit 24 manages DMA transfers based on DMA descriptors in host memory that specify start address, length, etc. The buffer management unit 24 initiates a DMA read from system memory into the transmit buffer 18b by issuing an instruction to the DMA interface 16b, which translates the instructions into PCI bus cycles. Hence, the buffer management unit 24 contains descriptor management for DMA transfers, as well as pointers associated with storing and reading data from the memory portion 18. Although the buffer management unit 24 and the memory management unit 22 are shown as discrete components, the two units may be integrated to form a memory management unit controlling all transfers of data to and from the memory unit 18.

The network interface device 20 includes a media access control (MAC) core 26, a general purpose serial interface (GPSI) 28, a media independent interface (MII) 30 for connecting to external 10 Mbps or 100 Mbps physical (PHY) transceivers, an external address detection interface (EADI) 32, an attachment unit interface (AUI) 34 having a Manchester encoder and decoder, and a 10/100 Mbps twisted pair transceiver media attachment unit (MAU) 36.

The network interface device 10 also includes a network port manager 38 configured for performing MII handshaking between two devices on an MII bus via the MII port 30. Such MII handshaking may include link information, programming information at the MII layer using a management data clock (MDC), and management data input/output (MDIO) paths.

The auto-negotiation portion 40 performs IEEE-compliant negotiation with a link partner on the PHY layer to exchange data indicating whether the link partner is capable of operating at 10 Mbps or 100 Mbps, and whether the link should be half-duplex or full-duplex.

The LED controller 44 selectively controls the generation of LED output signals based upon the internal decoding logic and network interface device status registers (not shown). The network interface device 10 also includes an IEEE 1149.1-compliant JTAG boundary scan test access port interface 36.

The EEPROM interface 42 connects to an EEPROM on either a network interface device adapter card or the motherboard of the host computer via a serial interface link. The EEPROM (not shown in FIG. 1) will be programmed with configuration information related to the network interface device, enabling the network interface device 10 to be configured during initialization via the EEPROM interface 42. Once initialized, the network interface device stores the configuration information in internal registers (not shown), enabling the network interface device to operate independently of the host computer in the event the host computer is powered down. Hence, the network interface device can be configured to operate while the host computer is in a stand-by mode, enabling the network interface device to output power up information to logic within the host computer to enable the host computer to automatically turn on in response to data packets received from the network and having a specific protocol, described below.

MEMORY MANAGEMENT ARCHITECTURE

Figure 2:
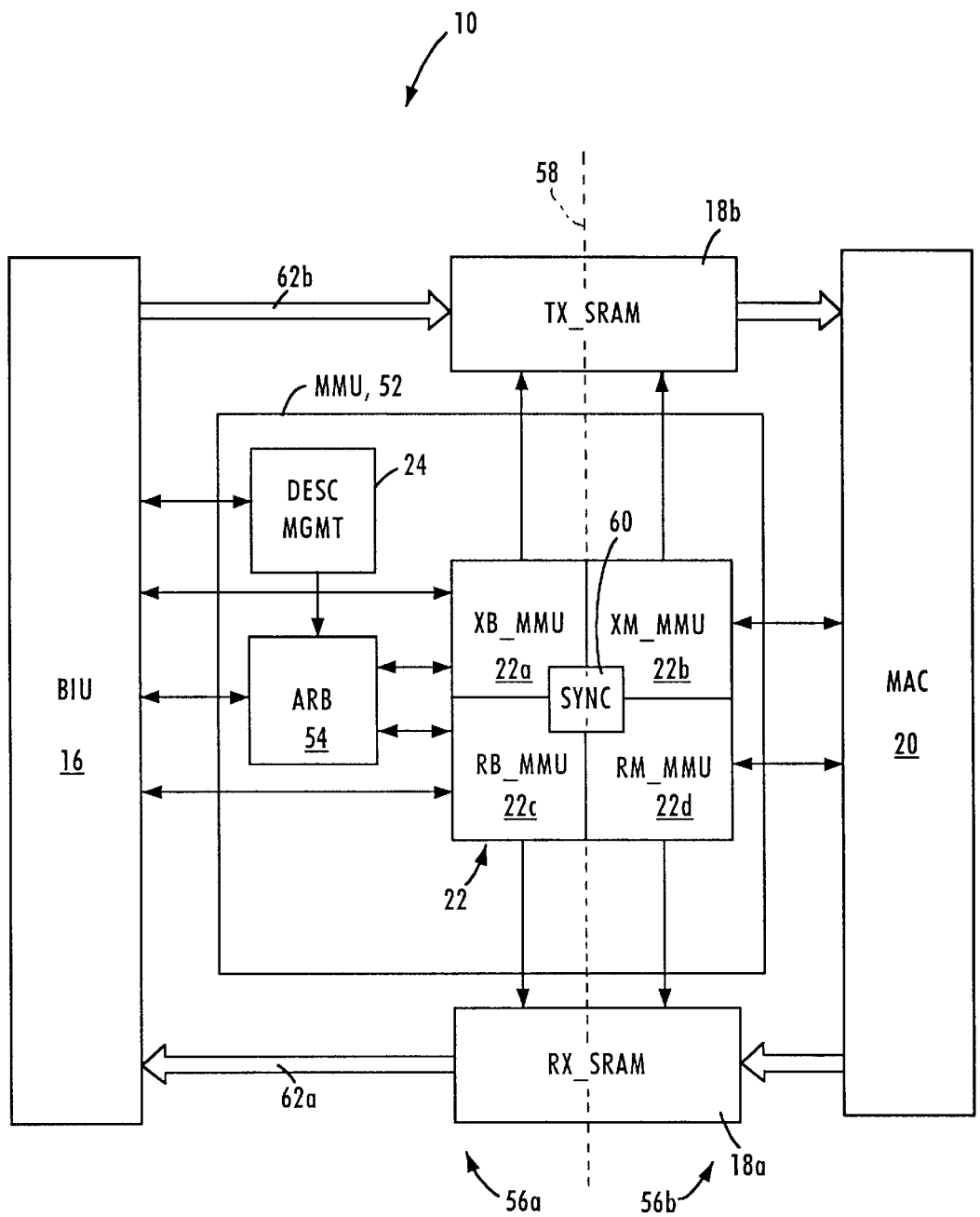
FIG. 2 is a block diagram illustrating in detail the buffer architecture of the network interface device of FIG. 1 according to an embodiment of the present invention.

FIG. 2 is a block diagram illustrating the buffer architecture of the network interface device 10 according to an embodiment of the present invention. As shown in FIG. 2, transfer of data frames between the PCI bus interface unit 16, also referred to as the bus interface unit (BRJ), and the MAC 20 is controlled by a memory management unit (MMU) 52 including the buffer management unit 24 and the SRAM MMU 22 of FIG. 1. The MMU 52 controls the reading and writing of data to the SRAM 18, illustrated in FIG. 2 as a receive SRAM portion 18a and a transmit SRAM portion 18b for convenience. It will be recognized in the art that the receive SRAM (RX_SRAM) 18a and the transmit SRAM (TX_SRAM) 18b may be implemented as a single memory device, or alternatively as two separate SRAM devices.

As shown in FIG. 2, the memory management unit 52 includes the buffer management unit 24, also referred to as the descriptor management (DESC MGMT) unit, the SRAM MMU 22, and an arbitration unit 54. The arbitration unit 54 arbitrates DMA requests for data transmission, data reception, descriptor lists from the descriptor management block 24, and status.

The SRAM MMU 22 includes separate controllers for each SRAM 18a and 18b, for both read and write operations. According to the disclosed embodiment, the network interface device 10 operates in two generic clock domains, namely a host computer bus clock domain 56a, and a network clock domain 56b. Since the network interface device 10 needs to send and receive data across two independent clock domains 56, divided by the dotted line 58, the SRAM MMU 22 needs to be able to write and read data to each SRAM 18a and 18b in a manner that tracks memory status independent of the PCI clock in the host computer domain and the MAC clock generated from network activity in the network domain 56b.

According to the disclosed embodiment, the SRAM MMU includes a transmit-data bus-side memory management unit (XB_MMU) 22a, a transmit-data MAC-side memory management unit (XM_MMU) 22b, a receive-data bus-side memory management unit (RB_MMU) 22c, a receive-data MAC-side memory management unit (RM_MMU) 22d, and a synchronization circuit 60. The XB_MMU 22a and the RM_MMU 22d operate as write controllers configured for writing frame data into the SRAMs 18b and 18a, respectively. The XB_MMU 22a and the RB_MMU 22c operate according to the PCI bus clock (CLK). The RM_MMU 22d operates according to the receive MAC clock (RX_CLK) received by the MAC 20, and the XM_MMU 22b operates under the control of the MAC transmit clock (TX_CLK) received by the MAC 20. The XM_MMU 22b and the RB_MMU 22c operate as read controllers configured for reading frame data from the SRAMs 18b and 18a, respectively. Hence, receive data from the MAC 20 is written into the RX_SRAM 18a under the control of the write controller 22d synchronous to the receive clock (RX_CLK) in the network clock domain 56b. Frame data stored in the RX_SRAM 18a is read and output to the BIU 16 via data path 62a under the control of the receive-data read controller 22c, which reads the frame synchronous to the PCI bus clock signal.

Similarly, transmit data to be output onto the network by the MAC 20 is written into the TX_SRAM 18b via data path 62b under the control of the transmit-data write controller 22a, configured for writing the frame data synchronized to the PCI bus clock (CLK). The stored transmit data is read and output from the TX_SRAM 18b to the MAC 20 under the control of the transmit-data read controller 22b according to the MAC transmit clock (TX_CLK) within the network clock domain 56b.

The presence of two separate clock domains 56a and 56b in writing and reading to a random access memory 18 requires that the write controller and read controller devices be coordinated and synchronized to ensure that no contention issues arise due to the relative independence of the two clock domains 56a and 56b. The SRAM MMU 22 includes a synchronization circuit 60 that asynchronously monitors the status of the RX_SRAM 18a and 18b, enabling the memory controllers to read and write to the memory 18 between the two clock domains 56a and 56b. Thus, problems that would ordinarily arise between the two clock domains in the individual memory management units 22a, 22b, 22c and 22d are avoided by use of the synchronization circuit 60 according to a prescribed arbitration logic.

Figure 3:
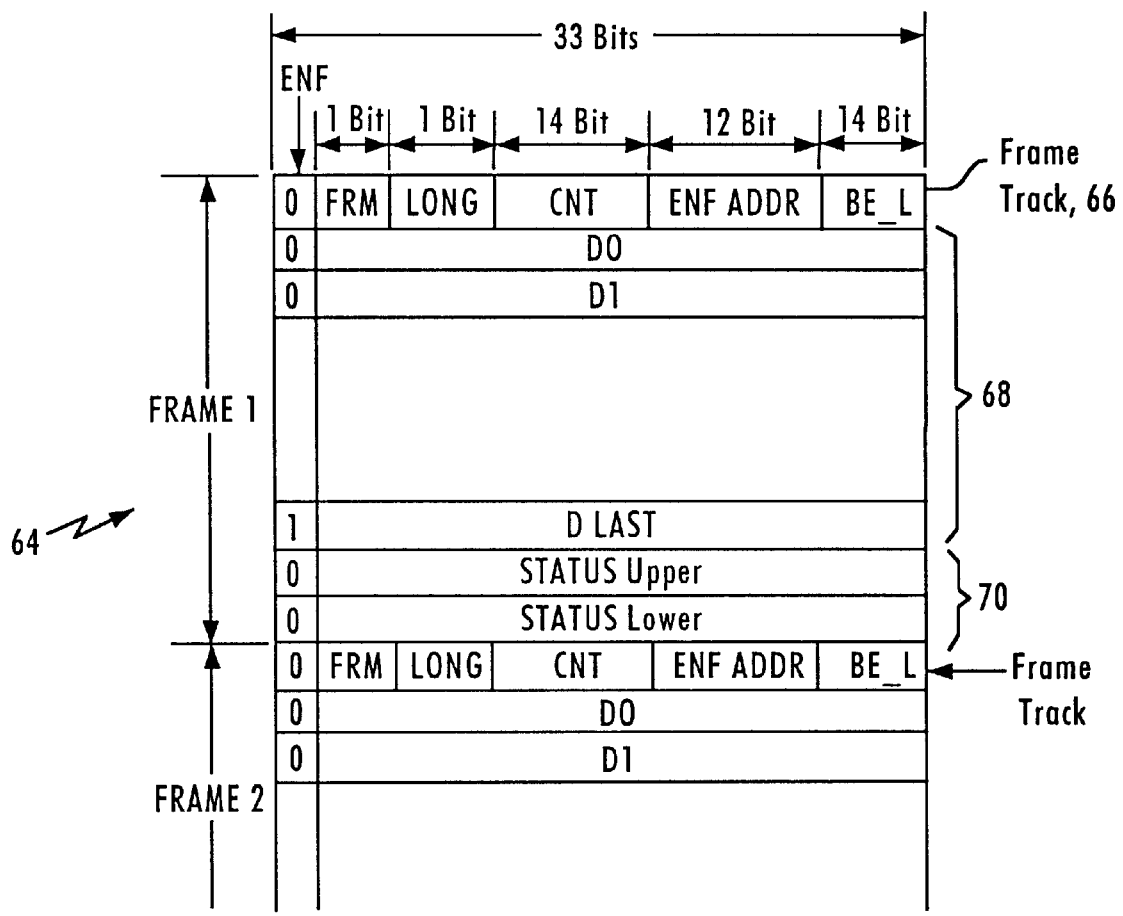
FIG. 3 is a diagram illustrating an exemplary data structure of a data frame stored in the random access memory of FIG. 1.

FIG. 3 is a diagram illustrating a data structure of a receive data unit in the RX_SRAM 18a. A similar structure also may be used for storing data in the TX_SRAM 18b. As shown in FIG. 3, each stored data frame 64 includes a frame track field 66 preceding a group of data bytes representing the frame data 68 (i.e., the packet data to be transmitted by the MAC 20), followed by a control field 70. In this case, the RM_MMU 22d stores frame track information 66 and the control field 70 related to the receive data frame 68. The frame track field 66 is used by the RB_MMU 22c to keep track of the location of the corresponding receive data frame 68 in the RX_SRAM 18a. Hence, the frame track 66 enables the RB_MMU 22c to quickly flush a stored data frame 64 having receive data 68 and jump to the beginning of the next stored data frame (e.g., 642), based on an end of frame address field (ENF ADDR), a count (CNT) field specifying the number of DWORDS (D0, D1, ..., DLAST), and an end of frame (FRM) bit indicating whether the data frame 64 contains valid data ready for reading. The byte enable-last field (BELL) specifies how many of the bytes in the DLAST field are valid. The long (LONG) field specifies whether the corresponding data frame is determined by the RM_MMU 22d to exceed a prescribed number of bytes, described below.

FIG. 4A is a diagram illustrating multiple data frames (F1, F2, etc.) stored in the RX_SRAM 18a. Assume that the RM_MMU 22d is writing a sequence of data frames 64 (frame 1, frame 2, etc.) into RX_SRAM 18a using a write pointer (WP), while the read controller 22c is reading out the data frames from the RX_SRAM 18a to the BIU 16 using a read pointer (RP). The read pointer (RP) value, is increased according to the same sequence used to increment the write pointer (WP) value, enabling use of the memory 18a as a FIFO-type buffer. Although the pointers are disclosed as incremented to adjacent memory locations, other sequencing arrangements (e.g., increment each time by 2, etc.) may be used.

If the read controller discards (e.g., flushes) a transmit data frame and desires to jump to the beginning of the next data frame, the synchronization circuit 60 must be able to track the start and beginning of each data frame to ensure that the read controller 22c properly locates the beginning of the next data frame. As the read and write pointers are incremented to point to the last memory location, they wrap-around to the starting memory location. One embodiment of this wrap-around mechanism involves the use of modulo counters that are relative to the size of the random access memory. An alternative is to simply reset the counters to the starting location value.

According to one embodiment, the synchronization circuit 60 includes read and write pointers for each SRAM 18a and 18b in order to enable the corresponding memory management unit to track the location of stored data. Since the writing and reading operations occur in two independent clock domains 56, however, a condition may arise as shown in FIG. 4B where the read and write pointers are about to point to the same memory location RP1.

For example, assume a read pointer value and a write pointer value are stored in binary counters, where a write pointer has a value (WR=100) and a read pointer in the second independent clock domain transitions from (RD=011) to (RD=100). Since the clock domain 56a and 56b operate independently of each other, a logic comparator performing a comparison between the write pointer and read pointer may erroneously conclude that the read and write pointers have different values at a point in time where the read pointer has a transitional value (e.g., 101, 111, or 000) as the read pointer is being updated. Hence, the attempt to perform an asynchronous comparison between the binary read and write pointers may cause an erroneous conclusion that the read and write pointers are not equal, causing a glitch in the full/empty flag.

One possible solution for preventing asynchronous comparisons during counter transitions is to provide latched outputs for the counter values. However, such an arrangement would severely degrade the timing performance of the random access memory as a buffer device. Notably, this problem affects the generation of the full and empty flag because of the reliance on accurately stored values in the counters. The full and empty flag is set by comparing read and write pointer values, which are stored in a read counter and a write counter, respectively. If the values in the counters are invalid, the full and empty flag will be set incorrectly.

SYNCHRONIZATION CIRCUIT OPERATION

According to the disclosed embodiment, the synchronization circuit 60 asynchronously compares read and write pointer values for each transmit SRAM 18b and receive SRAM 18a, where each counter is configured for changing a single bit of the corresponding pointer value in response to a corresponding signal from the associated MMU controller.

Figure 5:
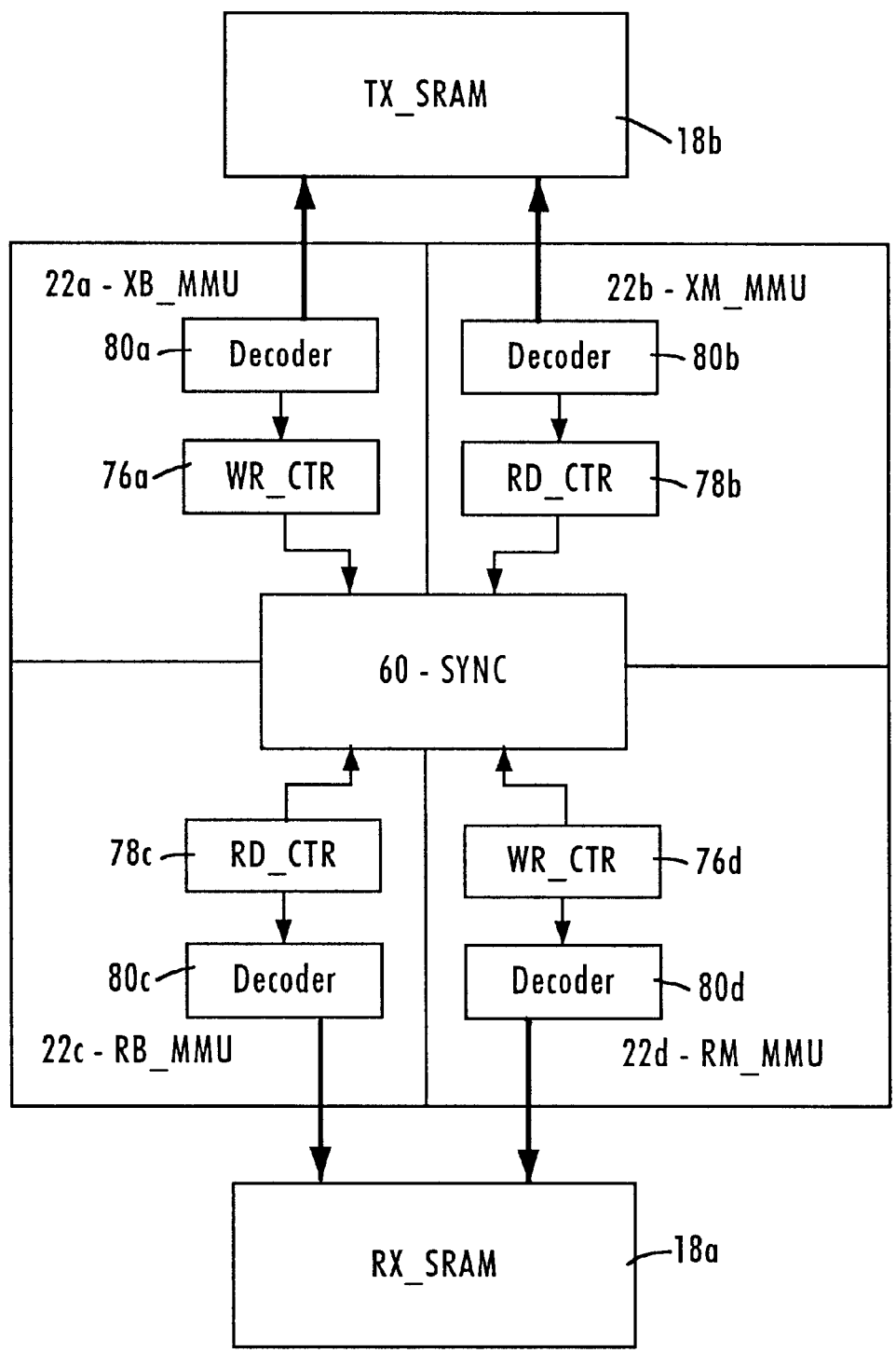
FIG. 5 is a block diagram illustrating the use of gray code decoders in the memory management unit in accord with an embodiment of the present invention.

As illustrated in FIG. 5, the disclosed embodiment contemplates the use of write counters 76a, 76d and read counters 78b, 78c external to the synchronization circuit 60. Each of the counters is implemented as gray code counters, thereby necessitating gray code decoders 80a, 80b, 80c, and 80d for writing to and reading from their respective SRAM 18a, 18b. For example, decoder 80a within the XB_MMU receives gray coded pointer values from the write counter 76a. Use of the gray code counter ensures that any asynchronous comparison between the write counter 76a and the read counter 78b does not result in any erroneous values due to multiple bit transitions that may otherwise occur in counters using binary-format representations. The decoder 80a then converts supplied pointer values into binary values that correspond to address locations within the TX_SRAM 18b. The other MMU components, 22b, 22c, and 22d similarly possess decoders for access to the SRAM, operating in a manner described with respect to the XB_MMU.

The read and write pointer values are also processed in the synchronization circuit 60 to set either a full flag or an empty flag. The read pointer value (RD_CTR) from read counter 78b and the write pointer value (WRCTR) from write counter 76a are supplied to the synchronization circuit 60, and the synchronization circuit 60 in response determines the number of bytes in the TX_SRAM 18b by comparing the supplied pointer values. In general, the comparison involves determining the difference between the read pointer value and the write pointer value. The resultant value is compared with the a predetermined value, which is the maximum size of the memory. If the values match, then the full flag is set to one, indicating a full condition. On the other hand, if the difference is zero, an empty condition is determined; thus, the empty flag is set to one.

In the alternative, decoders need not be used if the random access memory locations are themselves gray coded values. That is, the memory addresses are gray coded values in which case the pointer values do not require conversion into binary values. The operations of the synchronization circuit 60, according to the disclosed embodiment, is unaffected by presence or absence of decoders so long as the pointer values are gray codes.

By employing gray codes as read and write pointer values, synchronization issues inherent in a multi-clock environment are resolved.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A method in a network interface device, the method comprising:
    receiving data frames based on a first clock domain at a first interface of the network interface device;
    writing the data frames into a random access memory in the network interface based on the first clock domain;
    changing a single bit of a write pointer value in response to each occurrence of the writing step;
    reading stored data from the random access memory based on a second clock domain independent from the first clock domain;
    changing a single bit of a read pointer value in response to each occurrence of the reading step;
    forwarding the read data based on the second clock domain to a second interface on the network interface device;
    comparing the read pointer value and the write pointer value; and
    selectively setting one of a full and empty flag based on the comparing step;
    writing the data to the random access memory based on the binary write address value.

2. The method of claim 1, wherein the read and write pointer values are gray coded pointer values.

3. The method of claim 1, wherein the comparing step comprises determining the difference between the read pointer value and the write pointer value.

4. The method of claim 1, wherein the writing step comprises:
    decoding the write pointer value to a binary write address value; and
    writing the data to the random access memory based on the binary write address value.

5. The method of claim 4, wherein the reading step comprises:
  decoding the read pointer value to a binary read address value; and
  reading the data from the random access memory based on the binary read address value.

6. The method of claim 1, wherein the step of changing a single bit of the write pointer value comprises changing the single bit to obtain a predetermined write pointer value corresponding to a wrap-around condition in the random access memory.

7. The method of claim 1, wherein the step of changing a single bit of the read pointer value comprises changing the single bit to obtain a predetermined read pointer value corresponding to a wrap-around condition in the random access memory.

8. The method of claim 1, wherein the comparing step includes comparing the read pointer value and the write pointer value independent of the first and second clock domains.

9. A network interface device, comprising:
  a first interface configured to bi-directionally transmit data, wherein the first interface operates according to a first clock domain;
  a second interface configured to bi-directionally transmit data, wherein the second interface operates according to a second clock domain;
  a random access memory;
  a write controller configured for writing data received from the first interface to the random access memory according to the first clock domain, the write controller including a write counter configured for changing a single bit of a write pointer value in response to writing the data into a corresponding memory location in the random access memory;
  a read controller configured for reading stored data from the random access memory and outputting the read data to the second interface according to the second clock domain independent from the first clock domain, the read controller including a read counter configured for changing a single bit of a read pointer value in response to reading the stored data from a corresponding memory location in the random access memory; and
  a comparison circuit for selectively determining one of a full condition and an empty condition in the random access memory based on the write pointer value and the read pointer value, independent of the first and second clock domains.

10. The network interface device of claim 9, wherein the write counter and the read counter are gray code counters.

11. The network interface device of claim 10, wherein the comparison circuit determines the full condition and the empty condition based on a determined difference between the read pointer value and the write pointer value and a predetermined random access memory size.

12. The network interface device of claim 10, further comprising:
  a write decoder configured for decoding the write pointer value into a binary memory address value; and
  a read decoder configured for decoding the read pointer value into a binary memory address value.

13. The network interface device of claim 9, wherein the read counter and the write counter are modulo counters relative to a size of the random access memory.

14. A network interface for passing data frames comprising:
  a host bus interface, wherein the host bus interface operates according to a host clock domain;
  a network media interface, wherein the network media interface operates according to a network clock domain;
  a first random access memory partition;
  a second random access memory partition;
  a first write controller configured for writing data received from the host bus interface to the first random access memory partition according to the host clock domain, the first write controller including a first write counter configured for changing a single bit of a first write pointer value in response t o writ in g the data in to a corresponding memory location in the first random access memory partition;
  a first read controller configured for reading stored data from the first random access memory partition and outputting the read data to the network media interface according to the network clock domain independent from the host clock domain, the first read controller including a first read counter configured for changing a single bit of a first read pointer value in response to reading the stored data from a corresponding memory location in the first random access memory partition;
  a comparison circuit configured for selectively determining one of a full condition and an empty condition in the first random access memory partition based on the first write pointer value and the first read pointer value, independent of the host and network clock domains;
  a second write controller configured for writing data received from the net work media interface to the second random access memory partition according to the network clock domain, the second write controller including a second write counter configured for changing a single bit of a second write pointer value in response to writing the data into a corresponding memory location in the second random access memory partition;
  a second read controller configured for reading stored data from the second random access memory partition and outputting the read data to the host bus interface according to the host clock domain independent from the network clock domain, the second read controller including a second read counter configured for changing a single bit of a second read pointer value in response to reading the stored data from a corresponding memory location in the second random access memory partition; and
  the comparison circuit further configured for selectively determining one of a full condition and an empty condition in the second random access memory partition based on the second write pointer value and the second read pointer value, independent of the host and network clock domains.

15. The network interface device of claim 14, further comprising a first decoder and a second decoder for converting the first read pointer value and the first write pointer value into binary values corresponding to memory locations in the first random access memory partition, respectively.

16. The network interface of claim 14, further comprising a media access control supplying the network clock domain and a bus interface unit supplying the host clock domain from a host bus.

17. The network interface device of claim 14, wherein the first and second write counters and the first and second read counters are gray code counters.

18. The network interface device of claim 17 wherein the first read counter and the first write counter are modulo counters relative to a size of the first random access memory partition.

19. The network interface device of claim 14, further comprising a first decoder and a second decoder for converting the second read pointer value and the second write pointer value into binary values corresponding to memory locations in the second random access memory partition, respectively.

20. The network interface device of claim 17 wherein the second read counter and the second write counter are modulo counters relative to a size of the second random access memory partition.

\* \* \* \* \*

UNITED STATES PATENT AND TRADEMARK OFFICE
CERTIFICATE OF CORRECTION

PATENT NO.     : 6,473,818 B1                                       Page 1 of 1
DATED          : October 29, 2002
INVENTOR(S)    : Autumn J. Niu et al.

It is certified that error appears in the above-identified patent and that said Letters Patent is hereby corrected as shown below:

<u>Column 10,</u>
Line 16, replace "t o writ in g the data in to" with -- to writing the data into --

Signed and Sealed this

Tenth Day of June, 2003

JAMES E. ROGAN
*Director of the United States Patent and Trademark Office*